United States Patent
Singh et al.

(10) Patent No.: US 10,328,786 B2
(45) Date of Patent: Jun. 25, 2019

(54) HYBRID TRANSMISSION FOR A MOTOR VEHICLE

(71) Applicants: Tejinder Singh, Commerce, MI (US); Tomasz K Kietlinski, Grosse Pointe, MI (US); Daljit Singh, Sterling Heights, MI (US); Larry Diemer, Clarkston, MI (US)

(72) Inventors: Tejinder Singh, Commerce, MI (US); Tomasz K Kietlinski, Grosse Pointe, MI (US); Daljit Singh, Sterling Heights, MI (US); Larry Diemer, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/878,913

(22) Filed: Jan. 24, 2018

(65) Prior Publication Data

US 2018/0208040 A1 Jul. 26, 2018

Related U.S. Application Data

(60) Provisional application No. 62/450,657, filed on Jan. 26, 2017.

(51) Int. Cl.
| | |
|---|---|
| *F16H 3/66* | (2006.01) |
| *B60K 6/48* | (2007.10) |
| *B60K 6/365* | (2007.10) |
| *B60K 6/547* | (2007.10) |
| *F16H 3/72* | (2006.01) |

(52) U.S. Cl.
CPC ............... *B60K 6/365* (2013.01); *B60K 6/48* (2013.01); *B60K 6/547* (2013.01); *F16H 3/66* (2013.01); *F16H 3/724* (2013.01); *B60K 2006/4825* (2013.01); *B60Y 2200/92* (2013.01); *B60Y 2400/48* (2013.01); *F16H 2200/0013* (2013.01); *F16H 2200/0052* (2013.01); *F16H 2200/201* (2013.01); *F16H 2200/2041* (2013.01); *F16H 2200/2066* (2013.01);

(Continued)

(58) Field of Classification Search
None
See application file for complete search history.

(56) References Cited

U.S. PATENT DOCUMENTS

| | | |
|---|---|---|
| 7,008,346 B2 | 3/2006 | Stevenson |
| 7,018,318 B2 | 3/2006 | Klemen et al. |

(Continued)

*Primary Examiner* — Colby M Hansen
(74) *Attorney, Agent, or Firm* — Ralph E Smith

(57) ABSTRACT

A transmission includes input and output shafts, a hybrid module coupled to the input shaft and a gearbox coupled to the module and output shaft. The hybrid module includes an electric motor under driven by a gearset; a disconnect clutch coupled to the gearset and selectively to the input shaft; a launch clutch coupled to the disconnect clutch and selectively to a module output; and a vibration absorber coupled with the launch clutch. The gearbox includes three gearsets and five torque transmitting devices operable to generate six forward speeds and reverse. One torque transmitting device is a clutch brake applied with a piston that reaches over a park gear, and another one is a selectable one way clutch. Two of the torque transmitting devices are rotating clutches that are radially stacked. The transmission includes an electric only mode, a hybrid mode and a battery charging mode.

18 Claims, 7 Drawing Sheets

(52) U.S. Cl.
CPC ... *F16H 2200/2082* (2013.01); *Y02T 10/6221* (2013.01); *Y10S 903/911* (2013.01); *Y10S 903/919* (2013.01)

(56) References Cited

U.S. PATENT DOCUMENTS

| | | |
|---|---|---|
| 7,108,628 B2 | 9/2006 | Ziemer et al. |
| 7,344,470 B2 | 3/2008 | Adolf et al. |
| 7,354,376 B2 | 4/2008 | Rihn et al. |
| 8,562,480 B1* | 10/2013 | Mellet .................. F16H 3/725 |
| | | 475/317 |
| 9,052,003 B2* | 6/2015 | Garcia ................. F16H 37/046 |
| 9,182,013 B2 | 11/2015 | Gumpoltsberger et al. |
| 9,341,241 B2* | 5/2016 | Morio ..................... F16H 3/78 |
| 2007/0117668 A1* | 5/2007 | Sowul ................. B60L 11/123 |
| | | 475/5 |
| 2012/0178573 A1* | 7/2012 | Hart ....................... F16H 3/66 |
| | | 475/149 |
| 2014/0073475 A1* | 3/2014 | Maurer ................... F16H 3/66 |
| | | 475/279 |
| 2014/0106924 A1* | 4/2014 | Kienzle ................. F16H 3/663 |
| | | 475/276 |

\* cited by examiner

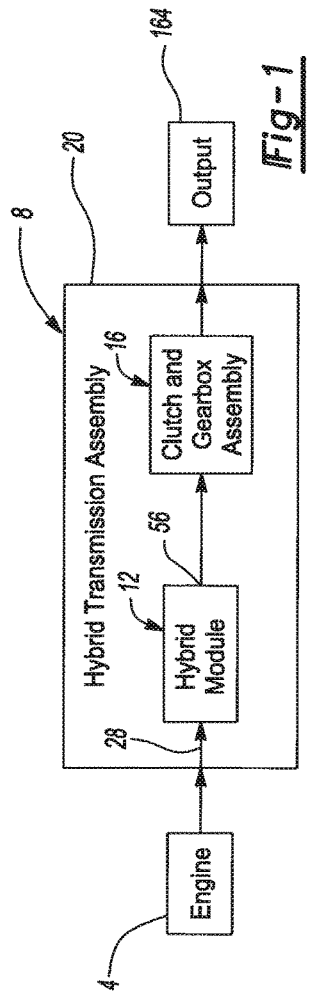
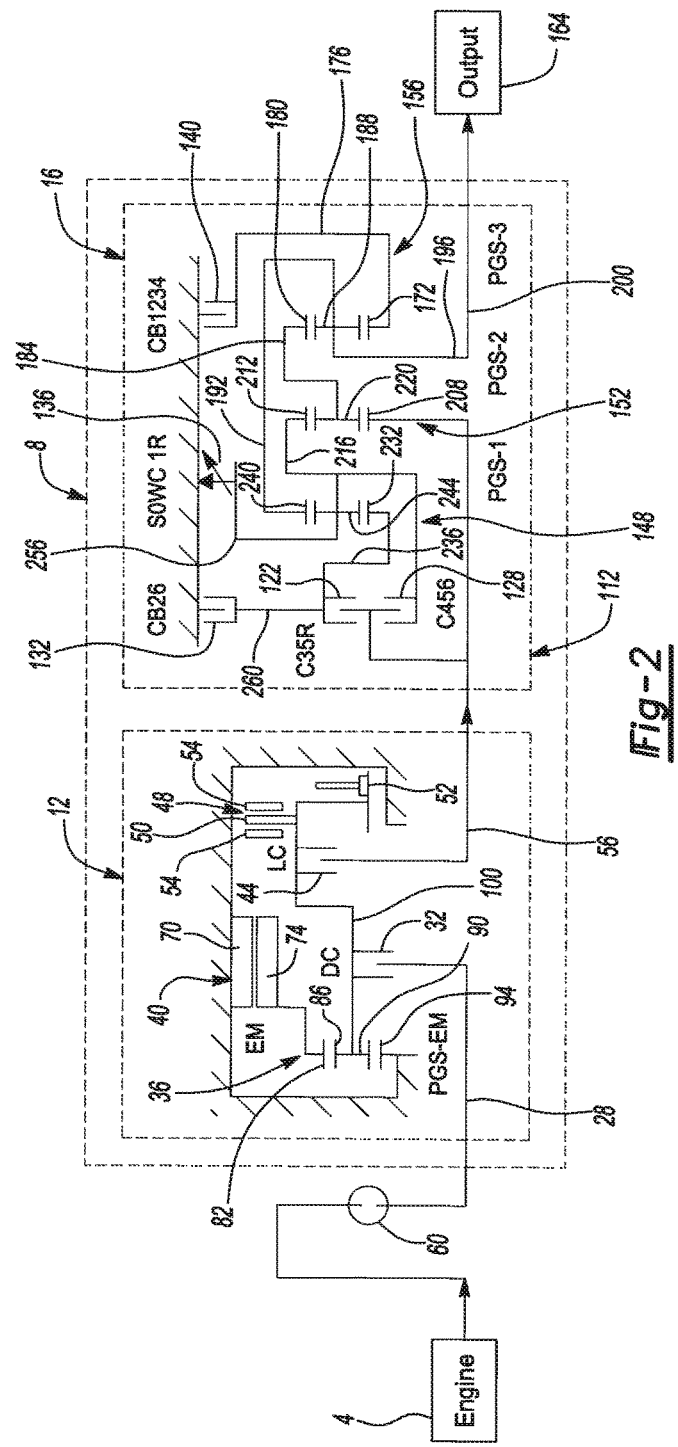
Fig-1
Fig-2

HYBRID TRANSMISSION FOR A MOTOR VEHICLE

CROSS REFERENCE TO RELATED APPLICATION

This application claims the benefit of U.S. Provisional Application Ser. No. 62/450,657, filed Jan. 26, 2017, the contents of which are incorporated herein by reference thereto.

FIELD

The present application relates generally to a hybrid powertrain for a vehicle and, more particularly, to a hybrid automatic transmission for a motor vehicle, where the hybrid transmission includes an electric motor coupled to a gearbox of the hybrid transmission.

BACKGROUND

Current hybrid automatic transmissions are often very complex assemblies that include multiple electric motors, compound planetary gear sets and over six clutches or brakes. Such assemblies are expensive to develop and manufacture, and are often oversized from both an overall size and a capacity perspective. Such hybrid transmissions can be too large for vehicles in which they are desired to be incorporated and/or may be over-capacitized for vehicles in which they are incorporated, thereby potentially cutting into fuel economy savings with extra weight and/or inefficiencies due to the transmission complexity. This can also result in unnecessary cost and weight being associated with such vehicles. Thus, while such hybrid transmissions do work well for their intended purpose, there remains a desire for improvement in the relevant art.

SUMMARY

In accordance with one example aspect of the invention, a multi-speed hybrid automatic transmission for a vehicle is provided. In one exemplary implementation, the transmission includes a transmission input shaft, a transmission output shaft, a hybrid module coupled to the input shaft and a gearbox coupled to the hybrid module and the output shaft. In this exemplary implementation, the hybrid module includes an electric motor underdriven by a module planetary gear set; a disconnect clutch coupled to the module planetary gear set and selectively to the transmission input shaft, which forms an input to the hybrid module; a launch clutch coupled for common rotation with the disconnect clutch and selectively to an output of the hybrid module, which forms an input to the gearbox; and a vibration absorber coupled for common rotation with the launch clutch. In this exemplary implementation, the gearbox includes three planetary gear sets and five torque transmitting devices operable to generate six forward speed ratios and reverse, where the gearbox input is coupled to a second planetary gear set of the three planetary gear sets and selectively coupled to one or both of two rotating clutches of the five torque transmitting devices. An output of the gearbox, which forms the transmission output, is coupled to a first planetary gear set of the three planetary gear sets. One of the five torque transmitting devices is a clutch brake that is applied with a piston that reaches over a park gear of the hybrid transmission, and another one of the five torque transmitting devices is a selectable one way clutch that is coupled to a third planetary gear set of the three planetary gear sets. The two rotating clutches are radially stacked relative to the gearbox input, and the hybrid transmission includes an electric only propulsion mode, a hybrid propulsion mode and a battery charging mode.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

BRIEF DESCRIPTION OF DRAWINGS

FIG. 1 is schematic illustration of an example implementation of a hybrid powertrain including a hybrid automatic transmission assembly in accordance with the principles of the present application;

FIG. 2 is an example schematic illustration of the example hybrid automatic transmission assembly of FIG. 1 in accordance with the principles of the present application;

DESCRIPTION

Figure 3:
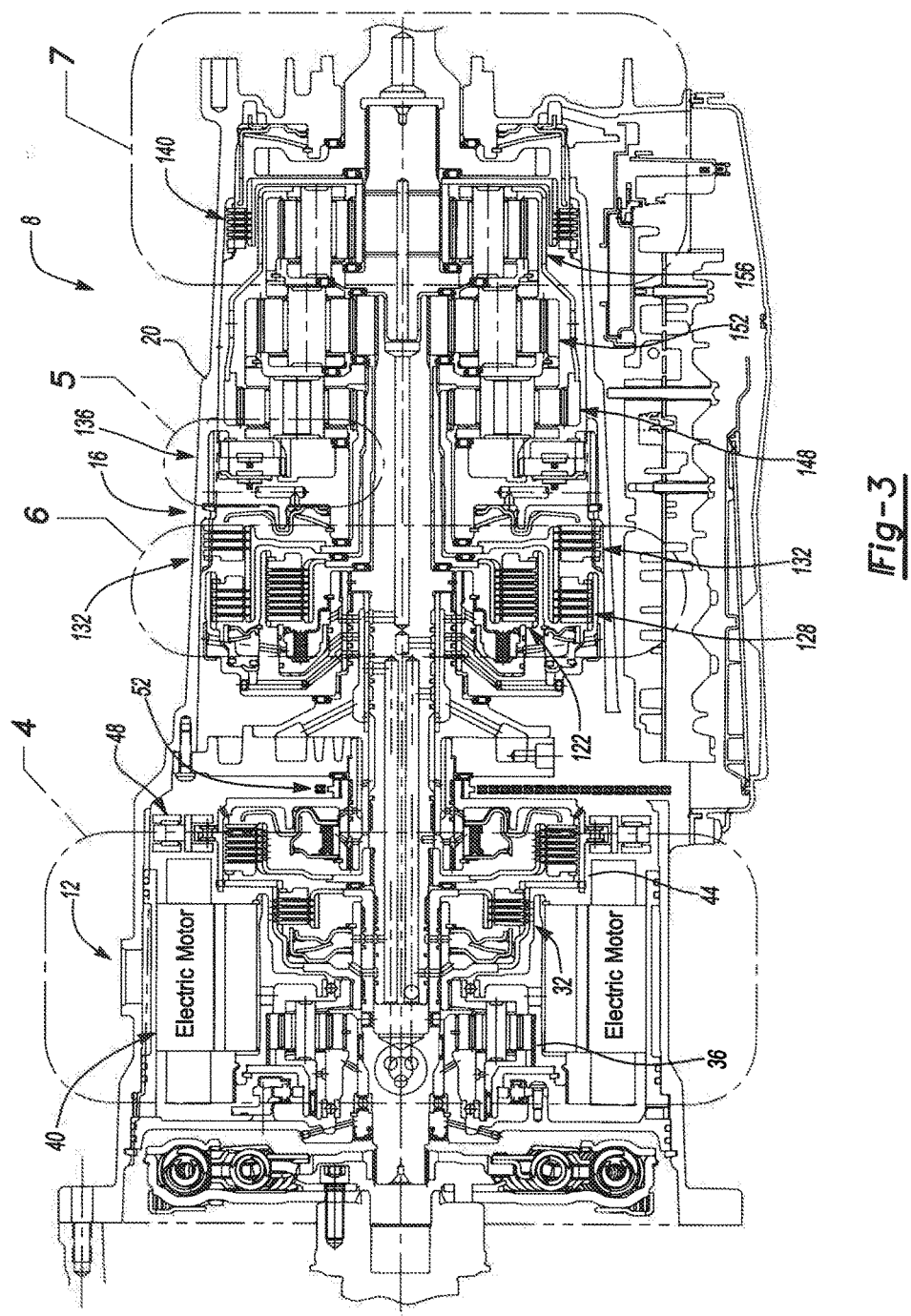
FIG. 3 is an example cross-sectional view of the example hybrid automatic transmission assembly of FIG. 1 in accordance with the principles of the present application.
Figure 4:
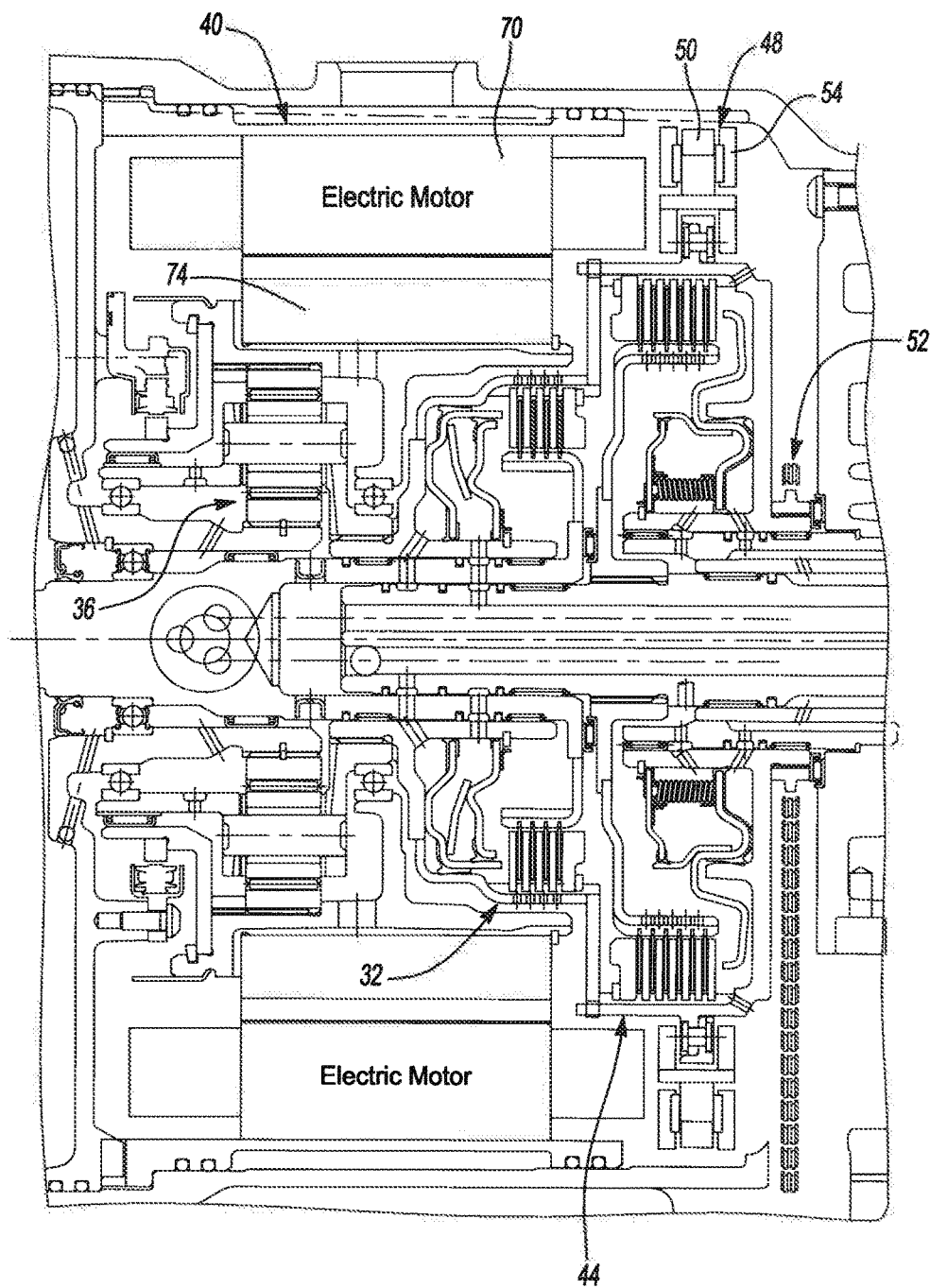
FIG. 4 is an enlarged view of the encircled area 4 in FIG. 3 in accordance with the principles of the present application.

In accordance with an example aspect of the invention and as will be discussed in greater detail herein, the a hybrid powertrain includes an engine or prime mover 4, a hybrid automatic transmission assembly 8 and a driveline including a final drive unit (not specifically shown), as generally shown in FIGS. 1-2. In this exemplary implementation, the hybrid transmission assembly or arrangement 8 may be referred to as a "P2" type hybrid automatic transmission assembly/arrangement and includes, in one exemplary implementation, a hybrid module 12 coupled to a clutch and gearbox assembly 16, both of which are housed, among other components of transmission assembly 8, inside transmission housing 20.

In the exemplary implementation illustrated in FIGS. 1-8, the hybrid automatic transmission assembly 8 includes six forward speeds/gears and reverse, and is configured for an all-wheel drive/rear wheel drive vehicle configuration. In one exemplary implementation, hybrid automatic transmission assembly 8 includes only six forward speeds in an effort to reduce an overall axial length of the transmission 8. The hybrid automatic transmission assembly 8 is configured to operate in various modes, including an electric vehicle (EV) mode, an engine on only mode, a battery charging at vehicle stop mode, and a hybrid mode (engine plus electric machine on mode), as will be discussed in greater detail below.

In the illustrated exemplary implementation of transmission assembly 8, the hybrid module 12 includes an input 28, a disconnect clutch 32, a planetary gear set 36, an electric motor or machine 40, a launch clutch 44, a vibration absorber 48, a pump 52 and an output 56, as shown for example in FIGS. 1 and 2. A damper system 60 is also provided between the engine and the hybrid module 12. In this exemplary implementation, the input 28 to the hybrid module 12 forms an input to the hybrid automatic transmission assembly 8. Similarly, the output 56 of the hybrid module 12 forms an input to the clutch and gearbox assembly 16, and may also be referenced as the transmission input shaft. Also in this implementation, the output 56 (or transmission shaft) forms the only torque carrying connection between the hybrid module 12 and the clutch and gearbox assembly 16.

In one exemplary implementation, the electric machine 40 is coupled to the planetary gear set 36 such that the electric machine 40 is underdriven by the planetary gear set 36. This planetary gear reduction provides for, among other benefits and features, reducing the size of the electric machine or motor 40, thereby providing for a smaller size transmission package and a reduction in mass of the transmission. In one exemplary implementation, this planetary gear set 36 is a simple planetary gear set.

The electric machine 40 generally includes a stator 70 and a rotor 74. In one exemplary implementation, the stator 70 includes a plurality of windings or phases and is secured to a stationary member, such as the transmission housing 20. The rotor 74, in one exemplary implementation, includes a plurality of magnets and/or ferromagnetic members and is disposed radially inwardly of the stator 70, as shown in various figures of the application. It will be appreciated that the rotor 74 may also comprise other construction configurations.

In the exemplary implementation illustrated, the rotor 74 of the electric machine or motor 40 is coupled to a ring gear 82 of planetary gear set 36, which is coupled through pinion gears 86 to a carrier 90, which is coupled through the pinion gears to the sun gear 94. The carrier 90 is coupled to a connecting shaft or member 100, to which the disconnect and launch clutches 32, 44 are separately, non-rotatably connected, as shown for example in FIG. 2. In one exemplary implementation, the disconnect and launch clutches 32, 44 are connected to the connecting shaft in a serial arrangement with the launch clutch 44 being downstream (further from the engine 4) of the disconnect clutch 32 but upstream of the centrifugal pendulum absorber (CPA) 48 and pump 52, which are also connected to the connecting member 100. The sun gear 94 of the planetary gear set 36 is connected to ground, such as the transmission housing 20, as shown in, for example, FIGS. 2 and 3.

Turning now to the clutch and gearbox assembly 16, this assembly includes, in one exemplary implementation, three planetary gear sets 112 and five torque transmitting devices configured to be selectively controlled to generate six forward gears or speed ratios and reverse, as will be discussed in greater detail below. In one exemplary implementation, the three planetary gear sets 112 are simple planetary gear sets. In one exemplary implementation, the three planetary gear sets 112 are separate, simple planetary gear sets arranged generally spaced apart from each other along a longitudinal length of the hybrid automatic transmission 8. In this exemplary implementation, none of the gears of one planetary gear set are shared with or form a gear of another one of the three planetary gear sets. In one exemplary implementation, the three planetary gear sets 112 are close coupled planetary gear sets. Each of the three planetary gear sets 112 generally includes a sun gear, a carrier supporting planet gears and a ring gear, as will also be discussed below in greater detail.

The three planetary gear sets 112 of the clutch and gearbox assembly 16 are interconnected in connection with the five torque transmitting devices. In one exemplary implementation, the clutch and gearbox assembly 16 includes only five torque transmitting devices. In this exemplary implementation, the five torque transmitting devices include two rotating clutches 122, 128 and three stationary/grounded clutches or brakes 132, 136, 140. In one exemplary implementation, one of the three stationary/grounded clutches or brakes 136 is a controllable selectable one way clutch (SOWC), as will be discussed below in greater detail.

The three planetary gear sets 112 include a first, second and third planetary gear sets 148, 152, 156. In this regard, and with reference to the third planetary gear set 156, which is positioned between the transmission output 164 and the second planetary gear set 152, the sun gear 172 is connected for common rotation with a connecting member 176 that is connected to clutch brake 140. The ring gear 180 is connected for common rotation with a second connecting member 184, and the carrier 188 is connected for common rotation with third and fourth connecting members 192, 196. The fourth connecting member 196 is connected for common rotation with the output shaft (or forms the output shaft) 200 of the transmission 8.

With reference to the second planetary gear set 152, the sun gear 208 is connected for common rotation with the transmission gearbox input shaft 56, as briefly discussed above. The ring gear 212 is connected for common rotation with a fifth connecting member 216, and the carrier 220 is connected for common rotation with the second connecting member 184.

With reference to the first planetary gear set 148 positioned, in one exemplary implementation, between the second planetary gear set 152 and the hybrid module 12, the sun gear 232 is connected for common rotation with a sixth connecting member 236, which is connected to rotating clutch 122. The ring gear 240 is connected for common rotation with the third connecting member 192, and the carrier 244 is connected for common rotation with the fifth connecting member 216 and a seventh connecting member 256. The fifth connecting member 216 is connected to the ring gear of the second planetary gear set 152 (as discussed above) and rotating clutch 128. The seventh connecting member 256 is connected to grounded clutch 136, which, in the exemplary implementation illustrated, is the selectable one way clutch (SOWC) discussed above. An eighth connecting member 260 connects the second rotating clutch 122 and the sixth connecting member 236 to the clutch brake 132.

As briefly discussed above, the torque transmitting devices provide for selective interconnection of shafts or connecting members, members of the three gearbox planetary gear sets and/or the transmission housing. For example, the rotating clutch 122 is selectively engageable to connect the sixth connecting member 236 with the transmission input 56, and the rotating clutch 128 is also selectively engageable to connect the fifth connecting member 216 with the transmission input. The clutch brake 132 is selectively engageable to connect the eighth connecting member 260, and thus the sixth connecting member 236, to the transmission housing 20 so as to restrict the eighth and sixth connecting members (which can be one member) from rotating relative to the transmission housing 20. The second clutch brake 136 in the form of the selectable one way clutch (SOWC) is selectively engageable to connect the seventh connecting member 256 to the transmission housing 20 so as to restrict the seventh connecting member 256 from rotating relative to transmission housing 20 in a first rotational direction, and will be discussed in greater detail below. It will be appreciated by those skilled in the art that the transmission includes other features and components for use in its overall operation.

Figure 7:
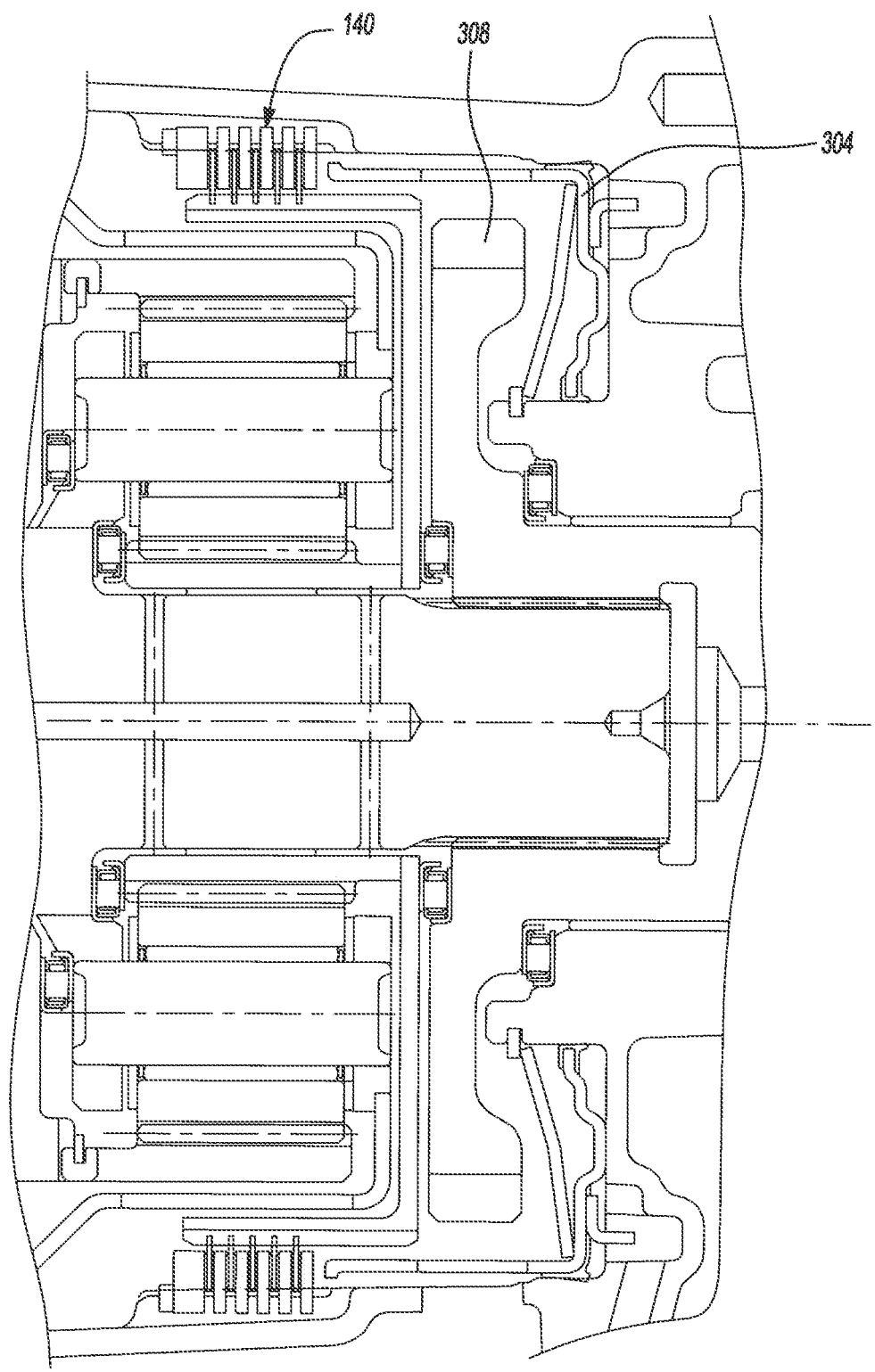
FIG. 7 is an enlarged view of the encircled area 7 in FIG. 3 in accordance with the principles of the present application.
Figure 8:
FIG. 8 is a table illustrating exemplary clutch application and shift sequences for the example hybrid automatic transmission of FIG. 1 in accordance with the principles of the present application.

With particular reference to FIGS. 3 and 7, application of clutch brake 140 will now be discussed in greater detail. In one exemplary implementation, the clutch brake 140 is applied with a piston 304 that reaches over a park gear 308 of the transmission 8. This arrangement provides for, among other benefits, more compact packaging and less axial or longitudinal length of transmission 8 (if the park gear 308 and piston 304 were arranged axially spaced apart from each other).

Figure 6:
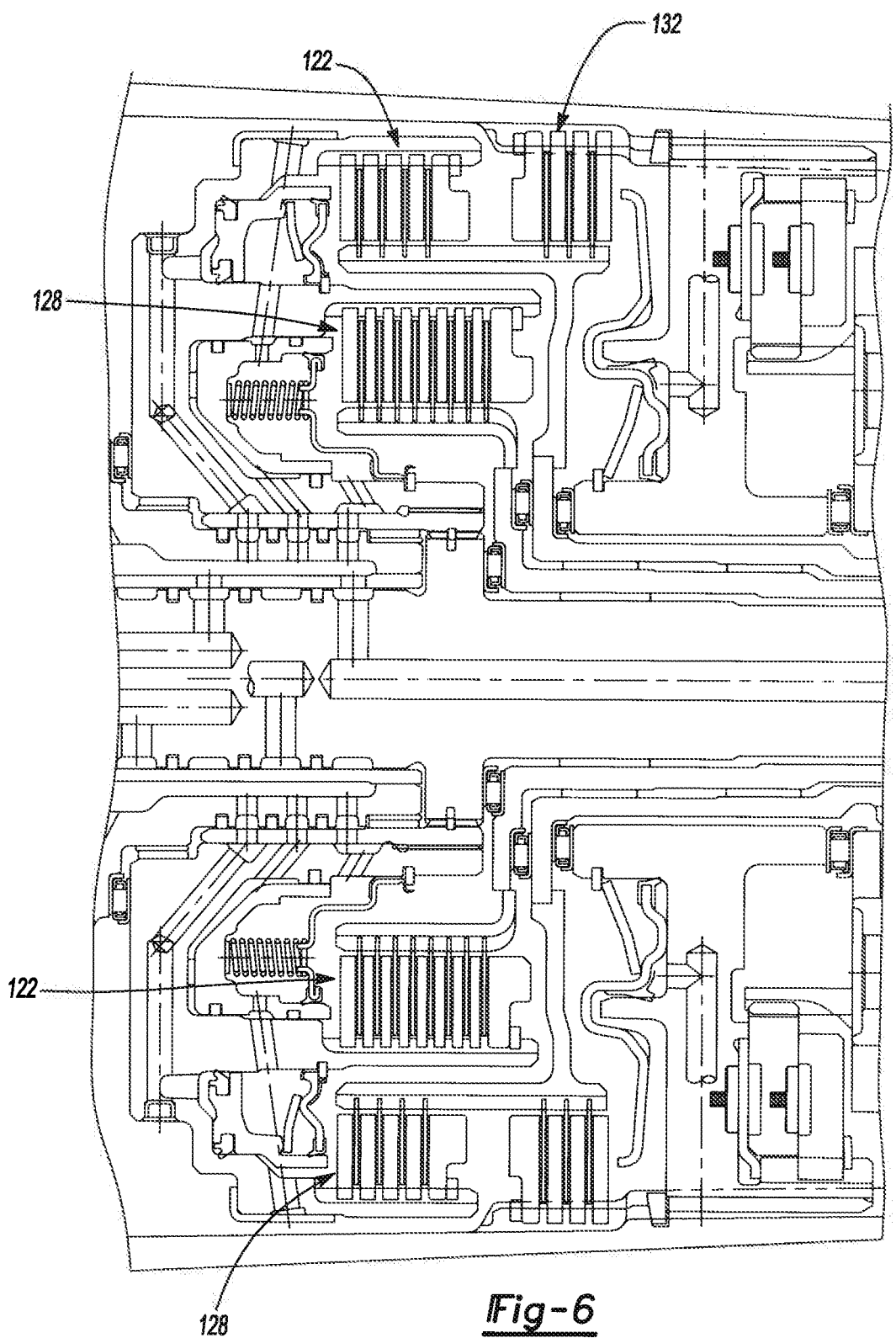
FIG. 6 is an enlarged view of the encircled area 6 in FIG. 3 in accordance with the principles of the present application.

Referring now to FIGS. 2, 3 and 6, the rotating clutches 122 and 128 will now be discussed in greater detail. In one exemplary implementation, the rotating clutches 122, 128 are radially stacked such that they axially overlap one another. In the exemplary implementation illustrated, the clutch 122 is radially outboard of radially inboard clutch 128 so that it is, from a perspective of looking radially outward from a radial center of transmission 8, positioned on top of clutch 128. In one exemplary implementation, clutch 122 is positioned directly radially above clutch 128 such that there are not any intervening elements therebetween. In one exemplary implementation, clutch 122 is positioned entirely over clutch 128 such that there is complete axial overlap of clutch 122 with clutch 128, thereby providing for more efficient packaging and a reduction in axial length of transmission 8.

The disconnect and launch clutches 32, 44 will now be discussed in greater detail in connection with general operation of the hybrid automatic transmission assembly 8. In one exemplary implementation and as briefly discussed above, the launch clutch 44 and the disconnect clutch 32 are separate clutches, controlled by a controller or the like, and are connected in series for common rotation with the same shaft or connecting member 100 associated therewith. This shaft or connecting member 100 is coupled to the carrier of the electric machine planetary gear set 36 at one end and to the centrifugal pendulum absorber 48 and a pump sprocket 52 downstream of the launch clutch 44 and proximate to and/or at the other end thereof.

The disconnect clutch 32 is controllable via a controller or the like to selectively engage and disengage the engine 4 and electric machine 40 and associate planetary gearing 36 from the remainder of the transmission 8. In other words, it can be controlled to disconnect the electric machine 40, gear set 36 and clutch and gearbox assembly 16 from the engine. The disconnect clutch 32 may also be utilized for improved noise vibration and harshness (NVH). For example, the disconnect clutch 32 may be controlled to be slipped, as needed, to mitigate NVH inputs, such as during an electric vehicle (EV) mode (discussed below).

The launch clutch 44 is a separate and separately selectively engageable clutch from the disconnect clutch 32 and provides for, among other modes and control features, battery charging. For example, the launch clutch 44 can be controlled to separate the clutch and gearbox assembly 16 from the electric machine 40 and gear set 36 while keeping the disconnect clutch 32 selectively engaged so as to use the engine 4 and electric machine 40 independently of the remainder of the transmission 8 to charge the associated battery (not shown) of the vehicle (not shown).

Returning to the above-discussed vehicle operating modes, and with reference to use of the disconnect and launch clutches 32, 44, in EV mode, the disconnect clutch 32 is controlled to be off or disengaged and the launch clutch 44 is controlled to be engaged or on. In the engine only operating mode, both the launch clutch 44 and the disconnect clutch 32 are controlled to be engaged. For charging the battery when the vehicle is stopped or stationary, the disconnect clutch 32 is controlled to be engaged and the launch clutch 44 is controlled to be disengaged. In the hybrid mode of operation where both the electric machine 40 and the engine 4 are providing propulsive torque, both the disconnect clutch 32 and the launch clutch 44 are controlled to be engaged. In one exemplary implementation, both the disconnect and launch clutches 32, 44 are rotating clutches. In one exemplary implementation, the launch clutch 44 provides robust cooling capacity as a rotating clutch and the disconnect clutch 32 is provided in a wet disconnect clutch layout.

Turning now to the SOWC 136, this clutch operates i) as a normal one way clutch for first to second and second to first transmission shifts, ii) in an overrun configuration for second to sixth gears, and iii) is locked with torque capacity for reverse and first gears. For example, the SOWC 136 provides a locked mode for reverse gear and manual first gear engine braking. The SOWC 136, in the normal mode, provides passive control of the release and apply of the clutch to improve the first to second and second to first shift feel of the transmission. Use of the SOWC 136 as discussed above and in place of a conventional clutch brake and/or conventional one-way clutch also reduces drag and improves fuel economy.

Figure 5:
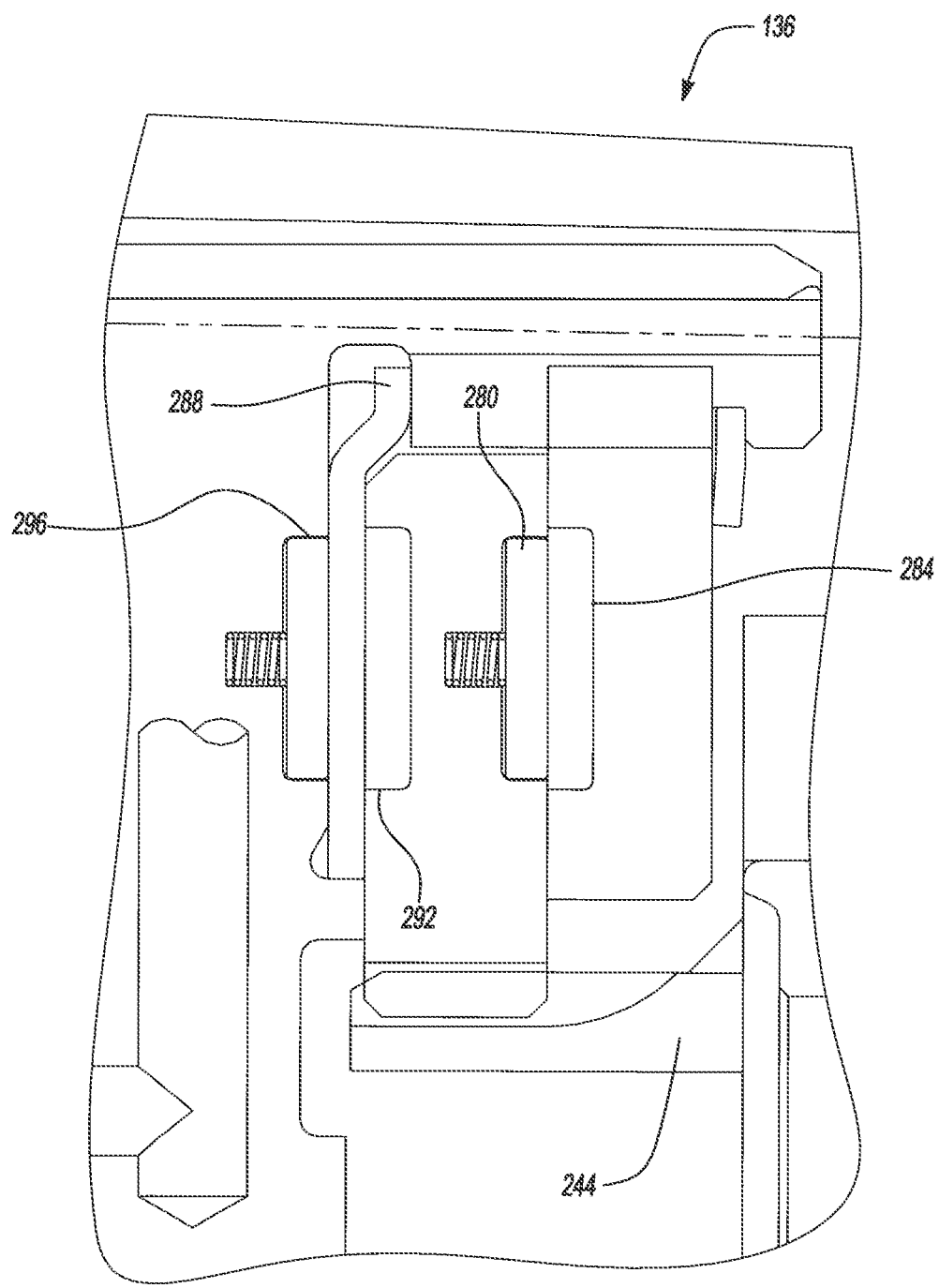
FIG. 5 is an enlarged view of the encircled area 5 in FIG. 3 in accordance with the principles of the present application.

In one exemplary implementation, the SOWC 136 is coupled to the carrier 244 of the first planetary gear set 148 and, as discussed above can operate as a typical or conventional one-way clutch where it is locked in one direction and overruns or freewheels in the other direction, or can be selectively engaged or actuated to be locked in both directions, where it is then grounded to transmission housing 20. With particular reference to FIG. 5, the SOWC 136 includes forward struts 280 operably associated with stationary forward notch plate 284, which is splined to housing 20. This forms the function of a conventional one way clutch, but with different componentry and positioning due to its use with the selectable portion discussed below. With additional reference to FIG. 8 and the clutch/brake actuation table 286 illustrated, it can be seen that the forward strut and notch plate arrangement, which is operably associated with carrier 244, freewheels in the reverse and second through sixth gears and is locked in first gear. This is because the carrier 244 spins in the freewheeling direction in reverse and second through sixth gears, and spins in the opposite direction in first gear, which locks this system of the SOWC 136.

The selectable portion or system of the SOWC 136 includes an actuatable selector plate 288, a reverse notch plate 292 and selectable reverse struts 296, noting that FIG. 5 illustrates the selector plate 288 in a non-actuated or engaged state. It can also be seen with reference to FIG. 8 that the selectable reverse struts 296 are not selected or engaged in second through sixth gears. However, the selectable reverse struts 296 are engaged in reverse gear such that the SOWC 136 is locked in both rotating directions. Further, the selectable reverse struts 296 are also engaged in first gear such that the SOWC is locked and the forward struts are also transmitting torque. Finally, FIG. 8 also illustrates that two clutches need to be engaged to generate power flow in each of first through sixth and reverse gears.

As briefly discussed above, the damper system of the hybrid automatic transmission assembly 8 includes a separate mass elastic damper 60 and a separate vibration absorber 48. In one exemplary implementation, the vibration absorber 48 is a centrifugal pendulum absorber (CPA). In the exemplary implementation illustrated, the centrifugal pendulum absorber 48 is positioned in the transmission housing 20 after the disconnect clutch of the hybrid module 12. In one exemplary implementation, the location is also at or after the launch clutch 44. In this configuration, the mass damper 60 is positioned on the primary side and the centrifugal pendulum absorber is positioned inside of the transmission housing 20, on the secondary side, where it is both protected and lubricated. In one exemplary implementation, the CPA 48 is directly connected to the launch clutch 44 and includes a cam 50 coupled to the launch clutch 44 and pendulums 54 movably coupled to the cam 50.

Placement of the centrifugal pendulum absorber 48 on the motorized side of the P2 system improves performance during stop/start cycles, which require careful cycle management. Separating the damper 60 also provides for more design flexibility of the damper 60 and better pre-conditioning of the input signal ahead of the centrifugal pendulum absorber 48. Inclusion of the centrifugal pendulum absorber 48 also provides for superior conditioning of the torque signature in hybrid electric vehicle (HEV) mode.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A multi-speed hybrid automatic transmission for a vehicle, comprising:
    a transmission input shaft and output shaft;
    a hybrid module coupled to the input shaft;
    a gearbox coupled to the hybrid module and the output shaft;
    the hybrid module including:
        an electric motor underdriven by a module planetary gear set;
        a disconnect clutch coupled to the module planetary gear set and selectively to the transmission input shaft, which forms an input to the hybrid module;
        a launch clutch coupled for common rotation with the disconnect clutch and selectively to an output of the hybrid module, which forms an input to the gearbox; and
        a vibration absorber coupled for common rotation with the launch clutch;
    the gearbox including:
        three planetary gear sets and five torque transmitting devices operable to generate six forward speed ratios and reverse;
        the gearbox input coupled to a second planetary gear set of the three planetary gear sets and selectively coupled to one or both of two rotating clutches of the five torque transmitting devices; and
        an output of the gearbox, which forms the transmission output shaft, and is coupled to a third planetary gear set of the three planetary gear sets;
    wherein one of the five torque transmitting devices is a clutch brake that is applied with a piston that reaches over a park gear of the hybrid transmission;
    wherein another one of the five torque transmitting devices is a selectable one way clutch that is coupled to a third planetary gear set of the three planetary gear sets; and
    wherein the two rotating clutches are radially stacked relative to the gearbox input; and
    wherein the hybrid transmission includes an electric only propulsion mode, a hybrid propulsion mode and a battery charging mode.

2. The transmission of claim 1, wherein the module planetary gear set is a simple planetary gear set having a sun gear connected to ground, a carrier connected to the disconnect clutch, and a ring gear connected to a rotor of the electric motor.

3. The transmission of claim 1, wherein the disconnect clutch and the launch clutch are separate clutches connected to each other for common rotation, the launch clutch being positioned after or downstream of the disconnect clutch.

4. The transmission of claim 1, wherein the vibration absorber is a centrifugal pendulum absorber having a cam coupled for common rotation with the launch clutch and pendulums movably coupled to the cam.

5. The transmission of claim 1, wherein a member connects the disconnect clutch, the launch clutch, the vibration absorber and a pump for common rotation, and wherein the vibration absorber is positioned at or downstream of the launch clutch.

6. The transmission of claim 1, wherein the disconnect clutch and the launch clutch are controllable to provide an engine only operating mode, the battery charging mode, the electric only propulsion mode and the hybrid propulsion mode utilizing torque provided by an engine and the electric motor.

7. The transmission of claim 6, wherein the disconnect clutch and the launch clutch are both rotating clutches.

8. The transmission of claim 6, wherein:
    the disconnect clutch is controlled to be actuated or engaged, the launch clutch is controlled to be non-actuated or disengaged, and the electric motor is controlled to free-spin to provide the engine only operating mode;
    the disconnect clutch is controlled to be engaged and the launch clutch is controlled to be disengaged to provide the battery charging mode;
    the disconnect clutch is controlled to be disengaged and the launch clutch is controlled to be engaged to provide the electric only propulsion mode; and
    wherein both the disconnect and launch clutches are controlled to be engaged to provide the hybrid propulsion mode.

9. The transmission of claim 6, wherein the disconnect clutch is controlled to be engaged and the launch clutch is initially controlled to slip when launching the vehicle in either of the engine only operating mode or the hybrid propulsion mode.

10. The transmission of claim 1, wherein:
    the transmission is a rear wheel drive transmission;
    the six forward speed ratios include only six forward speed ratios;
    the hybrid module includes only two clutches and only one electric motor;

the three planetary gear sets includes only the three planetary gear sets; and the five torque transmitting devices include only the five torque transmitting devices.

11. The transmission of claim 10, wherein the five torque transmitting devices include the two rotating clutches, the clutch brake that is applied with a piston that reaches over the park gear, another clutch brake, and the selectable one way clutch.

12. The transmission of claim 1, wherein the three planetary gear sets are each simple planetary gear sets and are each axially spaced apart from each other along a longitudinal length of the gearbox.

13. The transmission of claim 1, wherein the selectable one way clutch is coupled to a carrier of the first planetary gear set and selectively coupled to ground.

14. The transmission of claim 13, wherein the selectable one way clutch includes passive forward struts and selectively engagable reverse struts, the forward struts passively operate to overrun in second to sixth forward speed ratios with the reverse struts being controlled to be off.

15. The transmission of claim 14, wherein the reverse struts are selectively actuated to lock the selectable one way clutch for the first forward speed ratio and reverse.

16. The transmission of claim 1, wherein the two rotating clutches include a first rotating clutch actuated for fourth, fifth and sixth forward speed ratios, and a second rotating clutch actuated for third and fifth forward speed ratios and reverse.

17. The transmission of claim 16, wherein the second rotating clutch is stacked radially outboard of and over the first rotating clutch such that the first rotating clutch completely axially overlaps the second rotating clutch along a longitudinal length of the transmission.

18. The transmission of claim 1, wherein the output of the hybrid module forms the only input to the gearbox and the only torque carrying connection between the hybrid module and the gearbox.

* * * * *